UNITED STATES PATENT OFFICE.

ALBRECHT SCHMIDT, ERNST BRYK, AND ROBERT VOSS, OF HÖCHST-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

VAT DYE AND PROCESS OF MAKING SAME.

968,697. Specification of Letters Patent. Patented Aug. 30, 1910.

No Drawing. Application filed November 17, 1909. Serial No. 528,567.

*To all whom it may concern:*

Be it known that we, ALBRECHT SCHMIDT, Ph. D., chemist, ERNST BRYK, Ph. D., chemist, and ROBERT VOSS, engineer dipl., citizens of the Empires of Germany and Austria-Hungary, respectively residing at Höchst-on-the-Main, Germany, have invented certain new and useful Improvements in the manufacture of Vat Dyestuffs, of which the following is a specification.

We have found that by treating with a halogen the condensation-products from 6- (or 5-) amino-3-oxy-1-thionaphthene (meta- or para-amino-oxythionaphthene) and isatin or its substitution-products, analogues or the anilids of the isatin substituted in the "alpha" position, or the acidyl derivatives of these condensation-products, new vat-dyestuffs are obtained, which are distinguished from the primary dyestuffs by a different shade of color and by greater fastness.

In this process the halongenization may be effected with or without the addition of a dissolving or suspending agent such as concentrated sulfuric acid, water, carbon-tetrachlorid, nitrobenzene or the like. These products have the general formula:

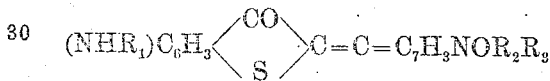

in which $R_1$ means H, acidyl; $R_2=$H, halogen—$NO_2$, $NH_2$; and $R_3=$H, halogen; being brownish to dark powders, insoluble in water, alcohol, benzene, ether, dilute acids and alkalies, soluble in concentrated sulfuric acid with a brownish-violet to blue color, and hardly soluble in hot nitrobenzene, anilin and the like, yielding when treated with alkaline reducing agents like hydrosulfite, a yellowish to brown vat from which cotton and wool are dyed very fast yellowish-brown to brown and grayish tints.

The new products dye cotton and wool in the alkaline vat tints which possess a considerably increased fastness as compared with the dyeings obtainable by the above-mentioned non-halogenized dyestuffs.

Example I: 10 grams of the condensation-product obtainable from 4-acetaminophenyl-2-thioglycol-o-carboxylic acid, or meta-aminoxythionaphthene, and isatin are heated with 150 grams of nitrobenzene and 30 grams of bromin for two hours to 160°. After cooling the mass is filtered off and the dyestuff washed by boiling it with alcohol. It forms a reddish-brown powder which is difficultly soluble in most of the solvents and which dyes wool and cotton in the alkaline vat yellowish-brown tints. The bromination may also be carried out for instance in presence of concentrated sulfuric acid, water, carbon tetrachlorid or the like, in which case a lower temperature is applied for the bromination.

Example II: 10 grams of the condensation-product obtainable from 4-acetaminophenyl-2-thioglycol-1-carboxylic acid, or meta-amino-oxythionaphthene, and dibromoisatin are heated with 150 gram of nitrobenzene and 30 grams of bromin for 2 hours to 160°. The dyestuff isolated, as indicated in Example I, forms a brown powder, which is very difficultly soluble in all of the solvents and which dyes wool and cotton in the alkaline vat yellowish-brown tints. The dyeings obtainable by this dyestuff are of still better fastness than those obtainable by the primary dyestuff.

Example III: 10 grams of the condensation-product obtainable from 4-acetaminophenyl-2-thioglycol-1-carboxylic acid, or meta-amino-oxythionaphthene, and α-isatin-anilid are heated with 150 grams of nitrobenzene and 30 grams of bromin for two hours to 160°. The further operation is carried out as stated in Example I. The resulting dyestuff forms a brown powder which is very difficultly soluble in all of the solvents and which dyes in the alkaline vat wool and cotton brown tints.

Example IV: 10 grams of the condensation-product obtainable from 5-acetaminophenyl-2-thioglycol-1-carboxylic acid, or para-amino-oxythionaphthene, and isatin are heated with 150 grams of nitrobenzene and 30 grams of bromin for two hours to 160°. After cooling the mass is filtered off and the dyestuff washed by boiling it with alcohol. It forms a blackish-brown powder, which dissolves very difficultly in all of the solvents and which dyes wool and cotton in the alkaline vat reddish brown tints.

Example V: 10 grams of the condensation-product obtainable from 5-acetaminophenyl-2-thioglycol-1-carboxylic acid, or para-amino-oxythionaphthene, and isatin-anilid are heated with 150 grams of nitrobenzene and 30 grams of bromin for 2 hours to 160°. The further operation is carried out as indicated in the foregoing example. The new dyestuff forms a blackish-violet powder which is difficultly soluble in all of the solvents and which dyes in the alkaline vat wool reddish-blue, cotton bluish-gray tints.

Example VI: 10 grams of the condensation-product obtainable from 12 grams of nitroisatin and 10 grams of 6-amino-3-oxy-1-thionaphthene (for instance in presence of acetic acid), or 10 grams of the condensation-product obtainable from 81 grams of meta-acetaminophenylthioglycol-ortho-carboxylic acid and 60 grams of nitroisatin (for instance in presence of acetic-acid-anhydrid), are heated in a reflux apparatus with 10 ccm. of bromin and 100 ccm. of nitrobenzene for about three hours. After cooling, the mass is filtered off and boiled with alcohol containing some bisulfite. The dyestuff thus obtained forms a brown powder, which is difficultly soluble in most of the solvents and which dyes in the alkaline vat wool and cotton brownish-yellow tints. If, instead of the said condensation-product, its reduction-product, obtainable by means of zinc and HCl, hydrosulfite, sodium sulfid or the like, is halogenized, dyestuffs are obtained which give similar tints. A like result is obtained if, in manufacturing the primary material, instead of the nitroisatin its reduction-product, the aminodioxindol, is condensed with the meta-amino-oxythionaphthene, or with the meta-acetaminophenylthioglycol-ortho-carboxylic acid and the thus-obtained condensation-products treated with halogen.

Having now particularly described our invention what we claim is:

1. The herein-described process of making vat-dyestuffs, which consists in treating with a halogen the products made by condensing the amino-oxythionaphthenes with the isatin derivatives, and having the general formula:

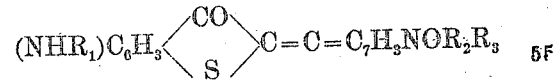

in which $R_1$ means H, acidyl; $R_2 = H$, halogen—$NO_2$, $NH_2$; and $R_3 = H$, halogen.

2. As new products, the herein-described vat dyestuffs, obtainable by halogenizing the products made by condensing the amino-oxythionaphthenes with the isatin-derivatives, and having the general formula:

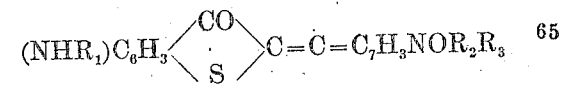

in which $R_1$ means H, acidyl; $R_2 = H$, halogen—$NO_2$, $NH_2$; and $R_3 = H$, halogen; being brownish to dark powders, insoluble in water, alcohol, benzene, ether, dilute acids and alkalies, soluble in concentrated sulfuric acid with a brownish-violet to blue color, and hardly soluble in hot nitrobenzene, anilin and the like, yielding when treated with alkaline reducing agents like hydrosulfite, a yellowish to brown vat from which cotton and wool are dyed very fast yellowish-brown to brown and grayish tints.

3. As a new product, the vat dyestuff obtainable by treating with halogen the condensation-product of isatin and meta-amino-oxythionaphthene in the manner herein described, said product being a reddish-brown powder, insoluble in water, dilute acids and alkalies, alcohol, benzene, ether; soluble in concentrated sulfuric acid with a violet-brown color, hardly soluble in hot nitrobenzene, yielding on treatment with alkaline reducing agents, like hydrosulfite, a yellow vat from which wool and cotton are dyed very fast brown tints.

In testimony whereof, we affix our signatures in presence of two witnesses.

ALBRECHT SCHMIDT.
ERNST BRYK.
ROBERT VOSS.

Witnesses:
CARL GRUND,
LUDWIG MUELLER.